W. O. LANE.
CABLE CLAMP OR SNUBBER.
APPLICATION FILED MAY 8, 1915.
1,185,804.
Patented June 6, 1916.
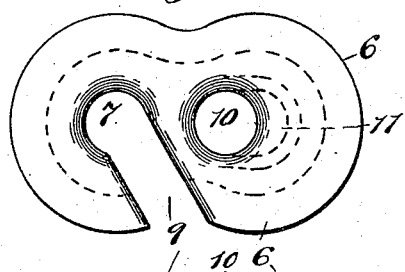
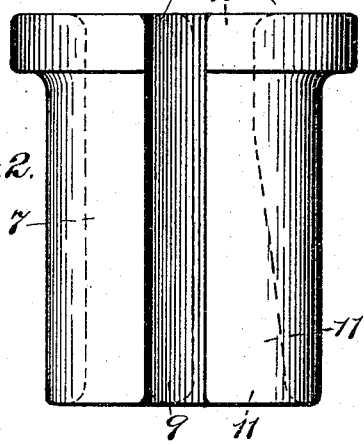
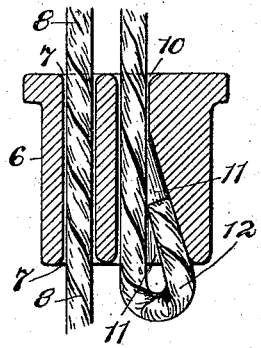
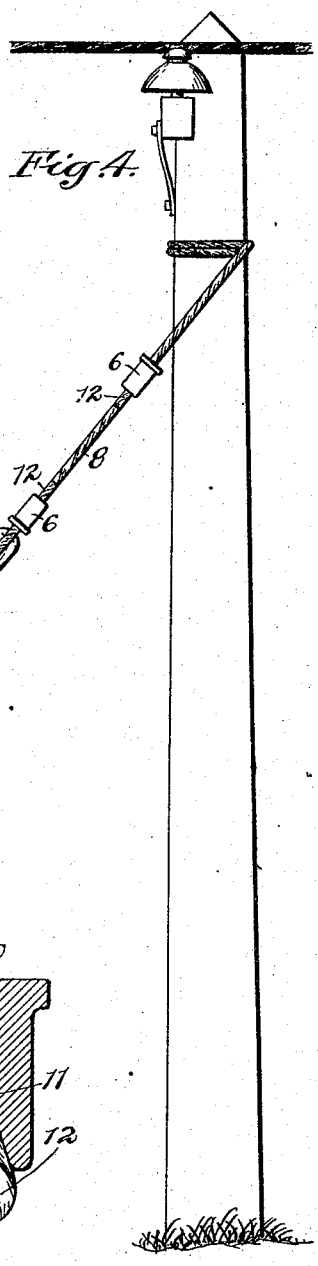
Inventor
William O. Lane.
By John A. Bommhardt
Attorney
Witness
S. W. Brainard.

UNITED STATES PATENT OFFICE.

WILLIAM O. LANE, OF CLEVELAND, OHIO.

CABLE CLAMP OR SNUBBER.

1,185,804.  Specification of Letters Patent.  Patented June 6, 1916.

Application filed May 8, 1915. Serial No. 26,709.

*To all whom it may concern:*

Be it known that I, WILLIAM O. LANE, citizen of the United States, residing at Cleveland, in the county of Cuyahoga and State of Ohio, have invented certain new and useful Improvements in Cable Clamps or Snubbers, of which the following is a specification.

This invention is a cable clamp or snubber especially adapted and intended for fastening the end of a cable or wire such as a guy line or the like, and the object of the invention is to provide a simple and cheap device for the intended purpose, which can be readily applied and easily connected or disconnected.

The device comprises a block having two passages, one for the standing part of the cable, and the other for the free end, the latter being tapered to receive the bent end or loop of the cable and clamp the same by a wedge action.

In the accompanying drawings Figure 1 is an end view of the device. Fig. 2 is a side view. Fig. 3 is a longitudinal section. Fig. 4 is an elevation illustrating the manner of use.

Referring specifically to the drawing, 6 indicates a block, conveniently made of metal or other suitable material. This block has a longitudinal bore or passage 7 for the standing part of the cable 8, and an inclined slot 9 extends from this passage through the side wall of the block, to permit the block to be readily placed on the cable at the desired position. The block also has a longitudinal bore 10, parallel to and beside the passage 7, and this passage is flared or inclined at one end, as shown at 11, forming a wedge-shaped slot or recess to receive the bent end or bight 12 at the free end of the cable.

In use on a guy, the cable may be looped around a breaker block 13, the standing part passing through the opening 7, and the free end caught by being bent and inserted in the wedge shaped recess 11, as shown in Fig. 3. The pull or strain on the cable will thus by wedge action confine the end 12 in the wedge shaped passage, thereby preventing slip and holding the end of the cable. The device may be quickly applied by slipping the standing part of the cable through the slit 9 and into the passage 7 and then inserting the free end through the passage 10 and bending it back into the inclined part 11 where it will be automatically caught.

The cable clamp or snub-block is preferably made right-handed as shown in Figs. 1, 2 and 3, but may be made left-handed as illustrated in Fig. 4.

What I claim as new is:

A cable holder comprising a block having parallel longitudinal passages through the same with a partition between the passages, and a longitudinal slit extending from one only of said passages through the side of the block, the other passage being tapered to form a wedge shaped recess.

In testimony whereof, I affix my signature in presence of two witnesses.

WILLIAM O. LANE.

Witnesses:
 JOHN A. BOMMHARDT,
 J. B. DAVIS.